(No Model.) 2 Sheets—Sheet 1.

A. FERREL.
STALK CHOPPER.

No. 386,190. Patented July 17, 1888.

Witnesses:

Inventor:
Alexander Ferrel,
By E. H. Gelston
His Attorneys.

(No Model.) 2 Sheets—Sheet 2.

A. FERREL.
STALK CHOPPER.

No. 386,190. Patented July 17, 1888.

Witnesses:
Geo. W. Graham.
Charles R. Eberle.

Inventor:—
Alexander Ferrel,
By E. H. Gelston.
His Attorneys.

UNITED STATES PATENT OFFICE.

ALEXANDER FERREL, OF TERRELL, TEXAS.

STALK-CHOPPER.

SPECIFICATION forming part of Letters Patent No. 386,190, dated July 17, 1888.

Application filed April 14, 1888. Serial No. 270,614. (No model.)

*To all whom it may concern:*

Be it known that I, ALEXANDER FERREL, a citizen of the United States, residing at Terrell, in the county of Kaufman and State of Texas, have invented certain new and useful Improvements in Stalk-Choppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improved stalk-chopper for corn, cotton, or other stalks, wherein a reel or reels carrying longitudinal knives is supported and adjusted upon a frame which may be easily connected with and disconnected from the running-gear of an ordinary wagon, and is driven by a belt from a sprocket-wheel bolted to one of the rear wheels of the wagon. This form of chopper is inexpensive and may be easily put in working order when required for use, and may be stored away in compact form when not in use.

The improvement consists in certain constructions and combinations of parts, hereinafter particularly described and claimed with reference to the accompanying drawings, wherein—

Figure 1:
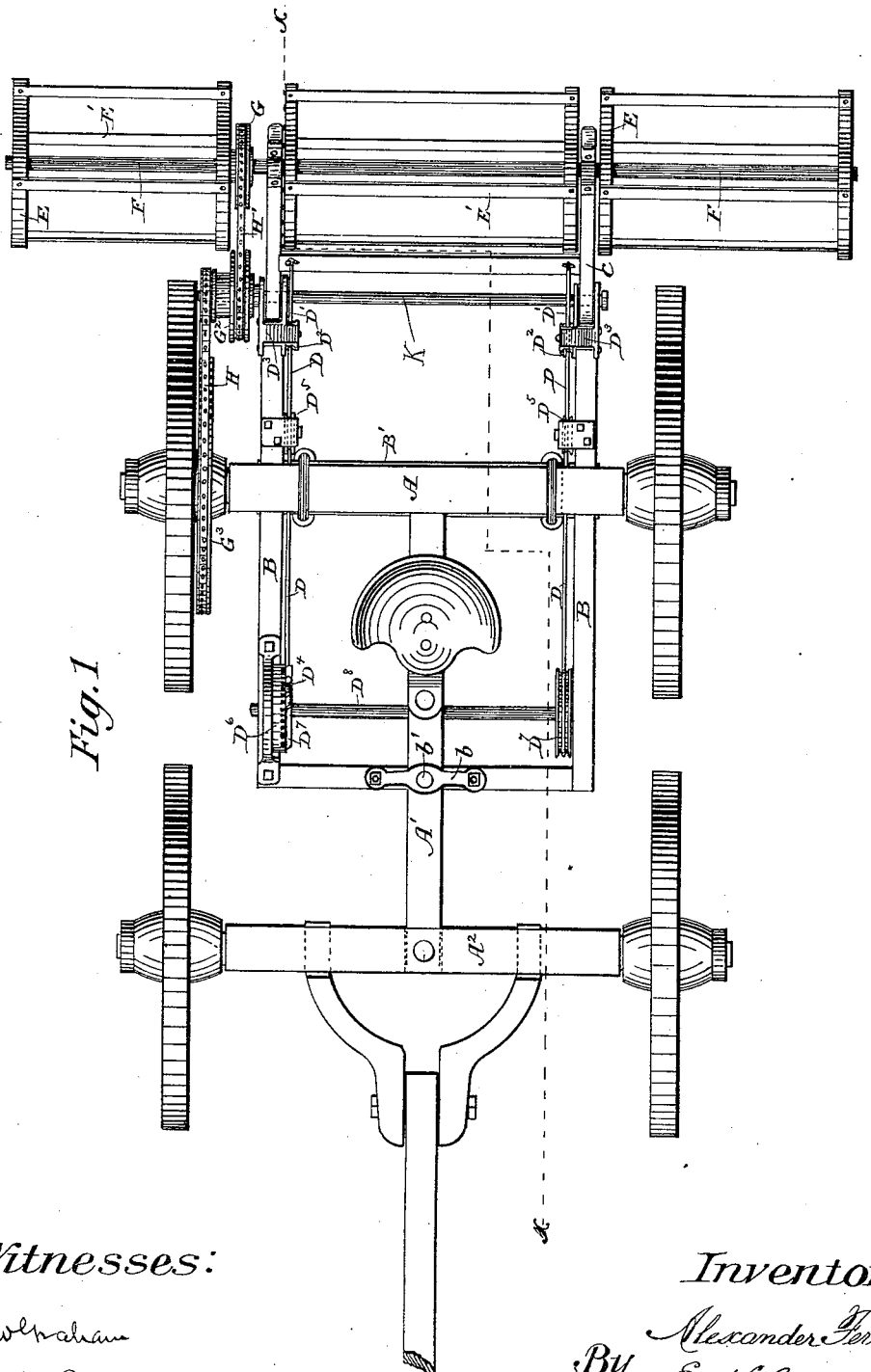
Figure 2:
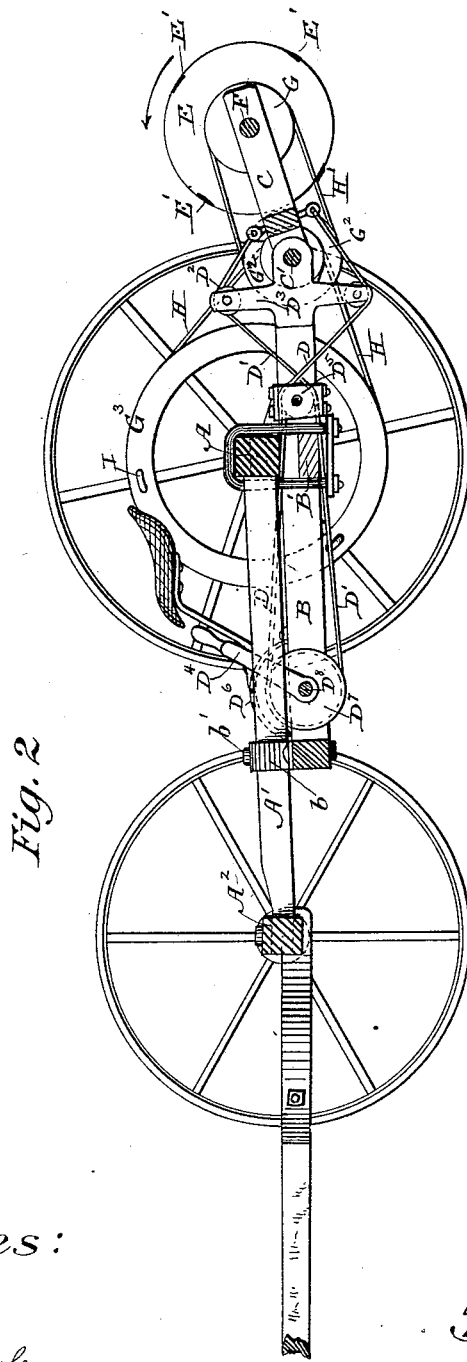

Figure 1 is a plan of the machine attached to the running-gear of an ordinary wagon; Fig. 2, a sectional elevation of the same in the line $x\ x$ of Fig. 1.

The rear axle, A, is connected by a reach, A', to the front axle, A$^2$, of an ordinary wagon.

The main frame B of the chopper is secured by a plate, $b$, and pin $b'$, at its forward end, to the reach of the wagon, and its rear cross-bar, B', is securely bolted to the rear axle, A, of the wagon.

An adjustable frame, C, is hinged at C' to the rear end of the main frame, and may be raised and lowered or swung up and down by means of cords D D' upon each side of the frame attached to the swinging frame C, and passed over or around guide-pulleys D$^2$ upon posts D$^3$ on the chopper-frame, and over a pulley, D$^5$, to band-wheels D$^7$, secured to a shaft, D$^8$, and operated by hand-levers D$^4$, adjustable upon arc-plates D$^6$, bolted securely upon said chopper-frame.

The reel E is fitted upon a shaft, F, supported in bearings in the swinging end of the adjustable frame C, by which means the knives E', secured to the reel, may be raised and lowered to any required height above the ground for work, for being lifted or raised over stumps or other obstructions, or for transportation from place to place.

Either two or three reels may be employed, all secured upon the same shaft, and adjusted or raised and lowered together, each to cut a row of stalks, and various modifications may be made in the details of construction without departing from my invention.

A pulley, G, upon the end of the reel-shaft, is connected by a belt or chain, H, passing over an idler, G$^2$, upon a shaft, K, connecting the main chopper-frame B and adjustable frame C. A pulley, G$^4$, upon the said shaft K, is driven by a belt, H', passing to a sprocket-wheel, G$^3$, bolted to the inner face of the rear wagon-wheel by means of hook-bolts I, which will admit of its ready removal from and replacement upon the wheel of the wagon.

I claim as my invention and desire to secure by Letters Patent—

In a stalk-chopper, the ordinary form of running-gear, A, in combination with the main frame B, secured thereto, as shown, terminating rearwardly in an adjustable frame, C, operated from the seat by a lever, D$^4$, and cords D D', passing over pulleys D$^2$ D$^5$ and band-wheel D$^7$, the reels E, pivotally mounted in said frame C on the shaft and carrying knives E', the shaft K, carrying the sprocket-wheel G$^2$, respectively communicating rearwardly with the wheel G by chain H' and forwardly with the wheel G$^3$ by chain H, whereby the rotation of the wheel G$^3$ is transmitted mediately to the reels E, for the purpose and in the manner set forth.

In testimony whereof I affix my signature in presence of two witnesses.

ALEXANDER FERREL.

Witnesses:
W. L. GORDON,
F. CAMPBELL.